United States Patent [19]
Supino et al.

[11] Patent Number: 5,914,922
[45] Date of Patent: Jun. 22, 1999

[54] GENERATING A QUADRATURE SEEK SIGNAL FROM A DISCRETE-TIME TRACKING ERROR SIGNAL AND A DISCRETE-TIME RF DATA SIGNAL IN AN OPTICAL STORAGE DEVICE

[75] Inventors: Louis Supino, Boulder; Jim Graba, Longmont, both of Colo.; Shuangxia Zhu, Austin, Tex.; Paul M. Romano, Boulder, Colo.

[73] Assignee: Cirrus Logic, Inc., Fremont, Calif.

[21] Appl. No.: 08/989,272

[22] Filed: Dec. 12, 1997

[51] Int. Cl.⁶ ........................................... G11B 7/09
[52] U.S. Cl. ...................... 369/44.28; 369/44.34
[58] Field of Search .............. 369/44.28, 44.27, 369/44.29, 44.25, 44.34, 44.35, 44.41, 32

[56] References Cited

U.S. PATENT DOCUMENTS

| | | |
|---|---|---|
| 3,665,413 | 5/1972 | Walsh et al. . |
| 3,716,825 | 2/1973 | Walsh et al. . |
| 4,054,862 | 10/1977 | Backman, Jr. . |
| 4,282,589 | 8/1981 | Evetts et al. . |
| 4,404,665 | 9/1983 | van Heyningen . |
| 4,849,764 | 7/1989 | van Heyningen . |
| 5,138,594 | 8/1992 | Fennema et al. . |
| 5,199,017 | 3/1993 | Kagami et al. . |
| 5,361,245 | 11/1994 | Yoshida et al. . |
| 5,457,671 | 10/1995 | Takata et al. . |
| 5,459,705 | 10/1995 | Matoba et al. ........................ 369/44.34 |
| 5,471,444 | 11/1995 | Wachi . |
| 5,481,510 | 1/1996 | Masaki et al. . |
| 5,499,230 | 3/1996 | Yanagi . |
| 5,581,526 | 12/1996 | Lewis . |

*Primary Examiner*—Muhammad N. Edun
*Attorney, Agent, or Firm*—Howard H. Sheerin; Dan A. Shifrin

[57] ABSTRACT

In an optical disk storage device wherein user data is demodulated from a light beam reflecting off data pits in tracks of an optical disk storage medium, a quadrature seek signal is generated indicative of the light beam crossing tracks of the optical disk during a seek operation. The quadrature seek signal is generated from a discrete-time tracking error signal (TES) and a discrete-time RF baseband signal. The discrete-time TES is generated according to the mode of operation, compact disk (CD) or digital video disk (DVD). In CD mode the TES is generated as the difference between E and F tracking photodiodes, and in DVD mode the TES is generated using a discrete-time differential phase detector (DPD). To generate the discrete-time RF baseband signal, the RF data signal (generated as the sum A+B+C+D of a four quadrant photodiode) is sampled at the channel rate and the RF data samples passed through a discrete-time envelope detector. The envelope detector extracts a discrete-time RF baseband signal which represents the light beam's location with respect to a track centerline. The discrete-time TES and baseband signals are synchronized and converted into binary square waves which form a quadrature seek signal (four transitions per track) for counting track crossings and for determining the radial seek direction.

19 Claims, 13 Drawing Sheets

GENERATING A QUADRATURE SEEK SIGNAL FROM A DISCRETE-TIME TRACKING ERROR SIGNAL AND A DISCRETE-TIME RF DATA SIGNAL IN AN OPTICAL STORAGE DEVICE

FIELD OF INVENTION

The present invention relates to servo control in an optical disk storage device (such as compact disk (CD), digital video disk (DVD), etc.), particularly to generating a quadrature seek signal from a discrete time tracking error signal (TES) and a discrete-time RF data signal.

BACKGROUND OF THE INVENTION

Optical disk drives, such as compact disks (CDs) and digital video disks (DVDs), are commonly used for storing large amounts of digital data on a single disk for use in audio/video or computer applications, and the like. The data on an optical disk is typically recorded as a series of "pits" arranged in tracks, where the length of the pit determines the presence of a digital "0" bit or a "1" bit. To read this recorded data, a servo system focuses a laser beam onto the surface of the disk such that the characteristics of the reflected beam allow detection of the data pits.

To this end, the servo system performs four operations: (1) a capture operation to "pull-in" the initial focus position, (2) a seek operation to move the beam radially over the surface of the disk to a desired track, (3) a centerline tracking operation to maintain the beam over the centerline of the selected track while reading the recorded data, and (4) a focus tracking operation to maintain proper focus as the disk spins over the beam.

Conventional optical disk drives use a head assembly comprised of a laser diode for generating the laser beam which is focused onto the surface of the optical disk through an objective lens. FIG. 1 illustrates a typical optical head assembly, the operation of which is well known by those skilled in the art. A laser diode 1 produces a light beam 2 which passes through a polarization beam splitter 3 and a collimator lens (not shown). The light beam 2 is then reflected by a prism 4, through an object lens (OL) 5, and onto the surface of the optical disk (not shown). The beam 2 reflects off the optical disc, again passes through the OL 5, and then reflects off prism 4 back toward the polarization prism 3 which deflects the beam 2 onto a four-quadrant photodetector 6. The signals output by the four-quadrant photodetector 6 are used to generate a focus error signal for focusing the OL 5 and a tracking error signal for tracking the centerline of the selected track. The four-quadrant photodetector 6 also generates an RF read signal for reading the recorded data.

In order to position the read head over a selected track during a seek operation, the entire sled assembly 8 slides radially along a lead screw 9 underneath the optical disk until the read head is positioned near the desired track. This coarse positioning (or coarse seeking) is accomplished by rotating the lead screw 9 in a clockwise or counterclockwise direction. Once near the selected track, OL voice coil motors (VCMs) (10A,10B) rotate an OL carriage unit 11 about a plastic hinge 12 in a "fine seeking" operation until the OL 5 is positioned directly over the desired track. Then, as the disk rotates and the track passes under the read head, the OL VCMs (10A,10B) perform fine adjustments in a "tracking" operation in order to maintain the position of the OL 5 over the centerline of the selected track as information is read from the disc.

The OL VCMs (10A,10B) also move the OL carriage unit 11 up and down in the direction shown in order to "capture" and "track" the OL 5 focus position. For focus capture and focus tracking the four-quadrant photodetector 6 generates an astigmatic focus error signal indicative of the distance between the OL 5 and the optical disc. At the beginning of a capture operation, the OL carriage unit 11 is initially positioned sufficiently away from the disk so that it is out of focus. Then the OL VCMs (10A,10B) slowly move the OL carriage unit 11 toward the disk with the focus servo loop open until the quadrant photodetector 6 indicates that the OL 5 is within its focus pull-in range. Once within the pull-in range, the focus servo loop is closed and the initial focus point is captured. Thereafter, the OL VCMs (10A,10B) track the in-focus position in response to the astigmatic focus error signal as the read head seeks to selected tracks and reads data from the disc.

Various methods are known in the prior art for generating a tracking error signal (TES) used to maintain the optical transducer over the centerline of the selected track during a read operation. For compact disk (CD) storage devices, the tracking error signal is normally generated as the difference between the E and F photodiodes 7A and 7B shown in FIG. 1. For digital video disk (DVD) storage devices, a differential phase detector (DPD) measures the phase offset between a pair of diagonal signals generated by the four-quadrant photodetector 6 to determine the position error as illustrated in FIG. 2A–2C. It should be noted that other types of photodetectors, such as a holographic photodetector, could be used to generate the diagonal signals. FIG. 2A shows three situations when the pit image is detected by the photodetector 6: left of center, at the center, and right of center. FIG. 2B shows the resulting diagonal signals generated by adding the (A+C) quadrants and the (B+D) quadrants, where the phase difference between these signals represents the position or tracking error. The tracking error signal (TES) is computed by converting the diagonal signals (A+C) and (B+D) into polarity square waves, as shown in FIG. 2C, and then extracting the offset or time difference between the square waves. The time difference is then integrated to generate the tracking error signal applied to the OL VCMs (10A,10B).

A problem with the above-described prior art method for generating the tracking error signal is that the differential phase detector is dependent on the spectral content of the data being read from the disk. Thus, the randomness of the recorded data results in gain variance in the servo tracking loop; to compensate for the gain variance, the tracking servo loop is normally operated at a low (sub-optimal) bandwidth. Another drawback of prior art differential phase detectors is a phenomenon known as "lens shift", an effective skew introduced into the diagonal signals due to generating the position error signal in continuous time.

During the seek operation, the position of the light beam on the disk is estimated by detecting track crossings. A track counter circuit increments/decrements a counter when it detects that the light beam has crossed a track. When the counter reaches a target value, the light beam will be on or near the target track. In the prior art, track crossings are typically estimated by detecting zero crossings or peaks in the continuous time tracking error signal (TES). The problem with this technique, of course, is that noise in the continuous TES signal may introduce spurious pules which can result in misdetected or falsely detected track crossings. Various prior art methods have been employed to reduce errors in the track crossing detector. For example, U.S. Pat. No. 5,199,017 employs hysteresis to prevent the detection of two consecutive positive or negative peaks in the TES, and U.S. Pat. No. 5,457,671 employs a "window signal" wherein TES zero crossings are detected only within a predetermined window, and if not detected then one is inserted.

In another prior art method for seeking a quadrature signal is generated from the TES signal and the data signal (i.e., the RF baseband signal) for use in counting track crossings as well as for determining the head's radial direction as it moves across the disk (i.e., radially in or out). Determining the radial direction of movement is important when the seek velocity is below the run-out velocity where the eccentricity of the disk can cause the direction of track crossings to actually reverse direction. The prior art methods for generating a quadrature signal from the TES and RF baseband signals are analog in nature and no methods are currently known to the applicant for generating the quadrature signal when the TES and RF baseband signals are generated in discrete time.

There is, therefore, a need for an improved seek detector for optical disk storage devices that can generate a quadrature signal from a discrete-time TES signal and a discrete-time RF baseband signal. In generating the quadrature signal, it is an object of the present invention to accurately detect peaks in the discrete-time TES and RF baseband signal in the presence of noise. Also, the period of the discrete-time TES and RF baseband signals may differ; thus another object of the present invention is to synchronize these signals before generating the quadrature signal.

SUMMARY OF THE INVENTION

In an optical disk storage device wherein user data is demodulated from a light beam reflecting off data pits in tracks of an optical disk storage medium, a quadrature seek signal is generated indicative of the light beam crossing tracks of the optical disk during a seek operation. The quadrature seek signal is generated from a discrete-time tracking error signal (TES) and a discrete-time RF baseband signal. The discrete-time TES is generated according to the mode of operation, compact disk (CD) or digital video disk (DVD). In CD mode the TES is generated as the difference between E and F tracking photodiodes, and in DVD mode the TES is generated using a discrete-time differential phase detector (DPD). To generate the discrete-time RF baseband signal, the RF data signal (generated as the sum A+B+C+D of a four quadrant photodiode) is sampled at the channel rate (baud rate) and the RF data samples passed through a discrete-time envelope detector. The envelope detector extracts a discrete-time RF baseband signal which represents the light beam's location with respect to a track centerline. The discrete-time TES and RF baseband signals are synchronized and converted into binary square waves which form a quadrature seek signal (four transitions per track) for counting track crossings and for determining the radial seek direction.

The binary square wave signals are generated by comparing the TES and RF baseband signals to respective thresholds; the binary signal changes states when the threshold is crossed. To increase noise immunity, the binary signal changes states only if two consecutive signal samples cross the threshold. To further increase noise immunity, the comparators employ hysteresis such that the binary signal changes state only if the two consecutive samples exceed a hysteresis value beyond the threshold.

BRIEF DESCRIPTION OF THE DRAWINGS

The above and other aspects and advantages of the present invention will be better understood by reading the following detailed description of the invention in view of the drawings, wherein.

DETAILED DESCRIPTION OF THE PREFERRED EMBODIMENT

Overview

Figure 10:
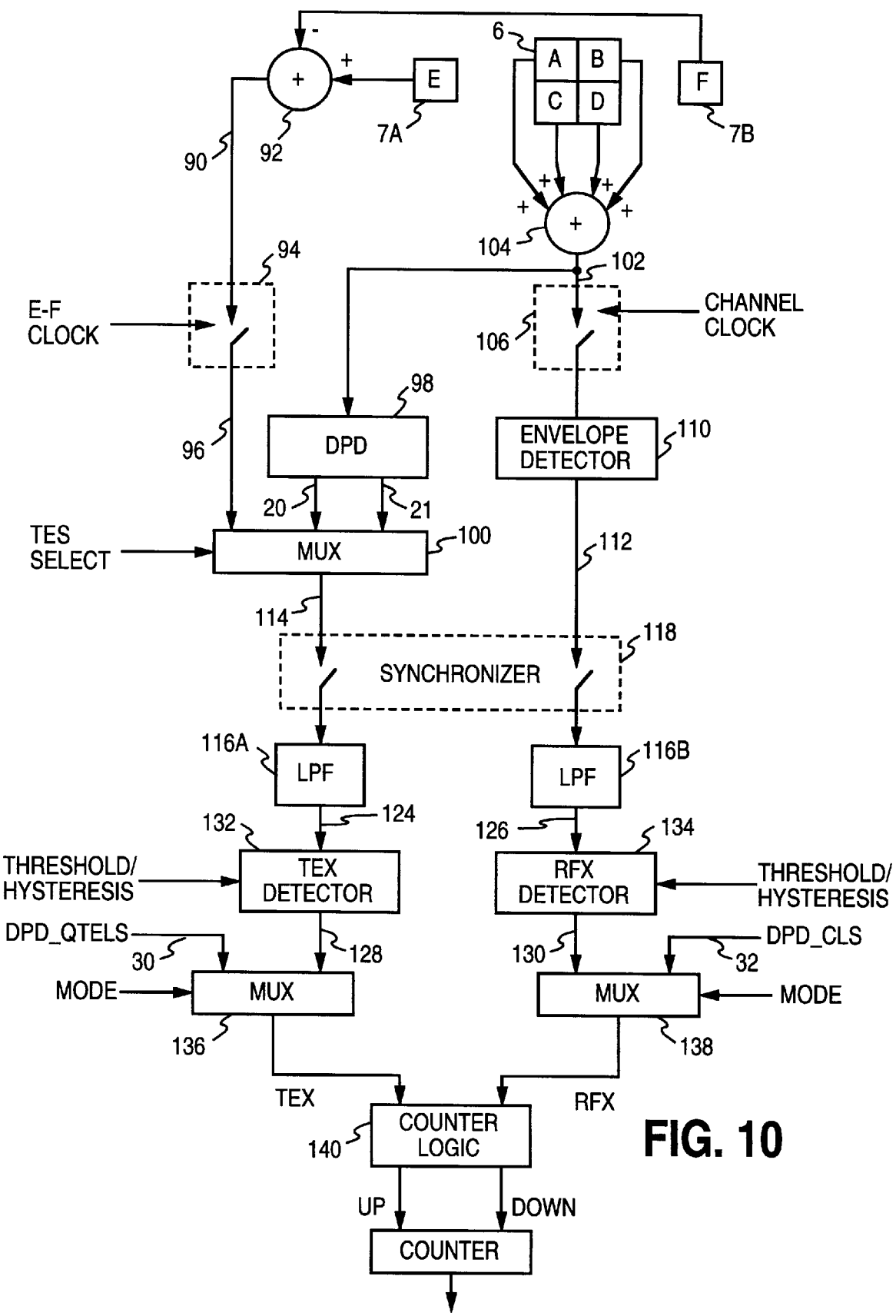
FIG. 10 is a block diagram of the track counting circuitry of the present invention, including a synchronizer for synchronizing the TES and RF baseband data signal.

An overview of the circuitry of the present invention for counting track crossings during a seek operation in an optical disk storage device is shown in FIG. 10. An important aspect is that the quadrature seek signal is generated from a discrete time tracking error signal (TES) and a discrete-time RF data signal (RFS). Generating the quadrature seek signal in discrete time overcomes the inherent process variations of analog components. Furthermore, it is necessary to filter the TES signal to extract the track crossing frequency and to attenuate noise at higher frequencies—an advantage of filtering the TES signal in discrete-time is that the filter's bandwidth automatically scales to the track crossing frequency by changing the sampling rate as the seek velocity changes. This aspect of the present invention is described in greater detail below.

Figure 1:
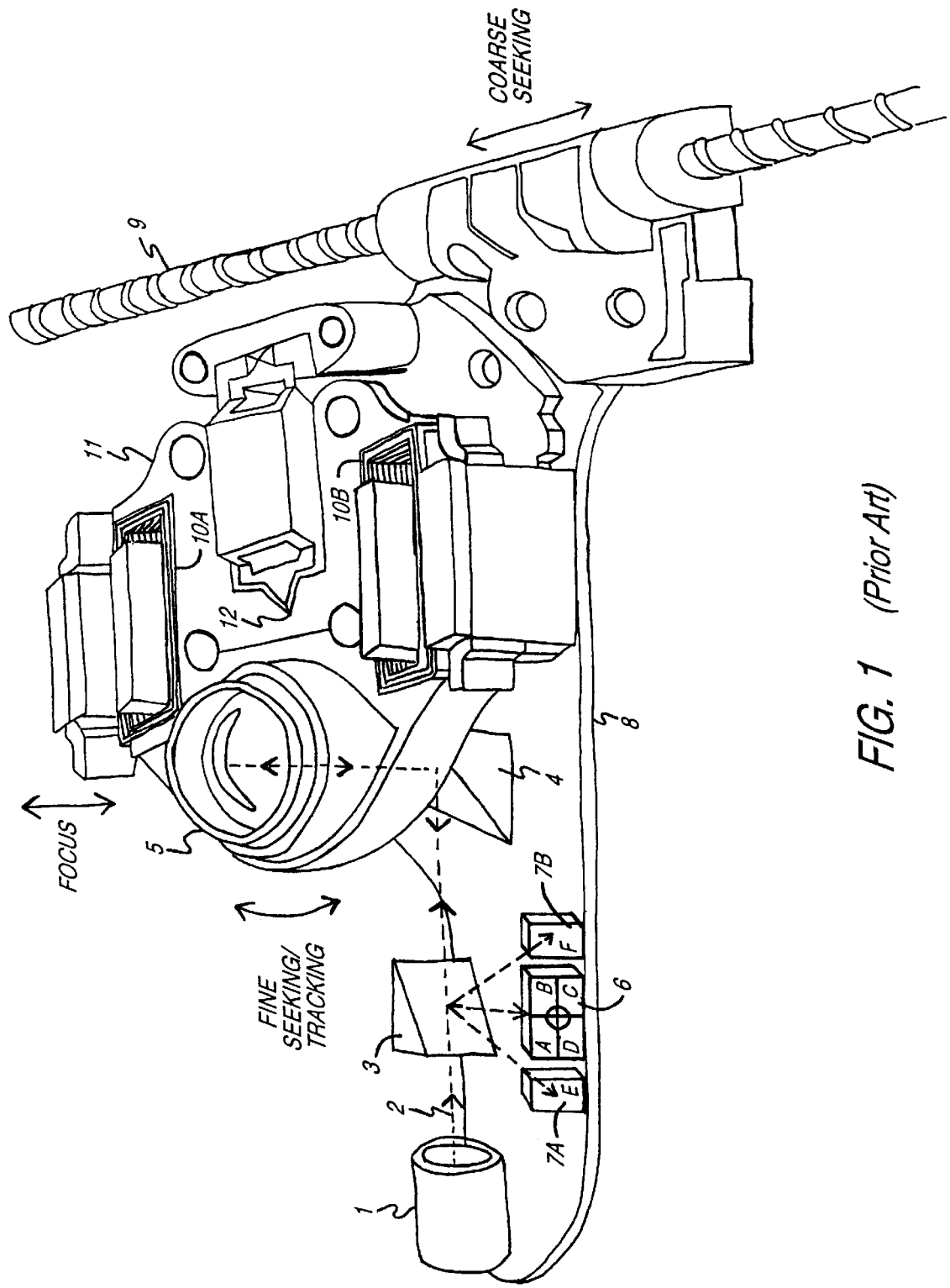
FIG. 1 shows a conventional optical head assembly positioned radially over the disk by means of a lead screw and optical carriage, where the tracking error signal (TES) is computed using E and F photodetectors for CD mode and diagonal signals of the four-quadrant photodetector for DVD mode.

In CD mode, the discrete-time TES signal is generated by sampling the analog signal generated as the difference between the E and F photodiodes 7A and 7B of FIG. 1. In DVD mode, the discrete-time TES signal is generated by a discrete-time differential phase detector (DPD) as described in more detail below. In both CD and DVD modes, the RF data signal is generated as the sum of the A, B, C and D photodiodes of the four-quadrant photodetector 6 of FIG. 1. The RF data signal is sampled and passed through an envelope detector which extracts a RF baseband signal indicative of the position of the light beam relative to the centerline of a data track.

The sample period of the TES and RF baseband signals is synchronized, as described in greater detail below, and the synchronized signals converted into binary square wave signals TEX and RFX. The binary square waves form a quadrature signal (four transitions per track) which is processed by counter logic to detect track crossings and to determine the radial seek direction of the light beam as it traverses over the disk. A track crossing counter is incremented/decremented when a track crossing is detected.

Differential Phase Detector

Figure 2A:
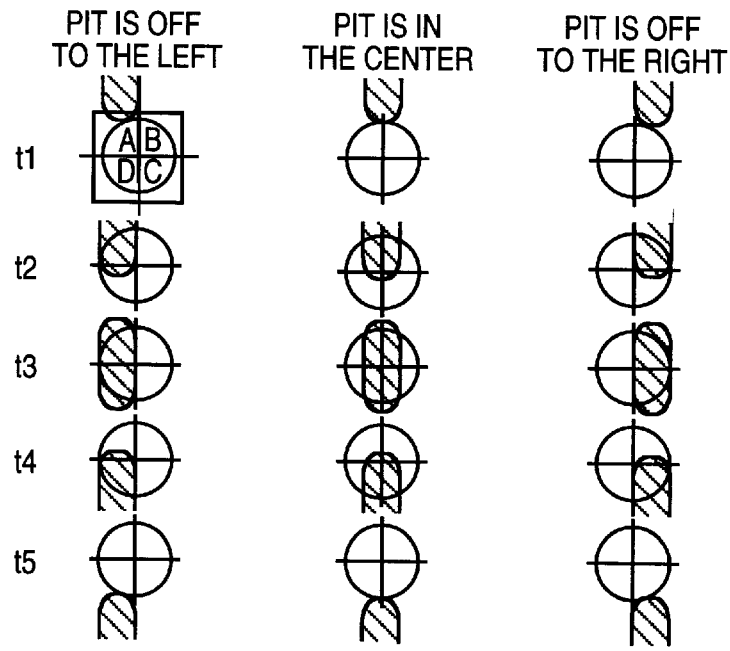
FIG. 2A–2C illustrate operation of a conventional differential phase detector for computing the position error during tracking.
Figure 2B:
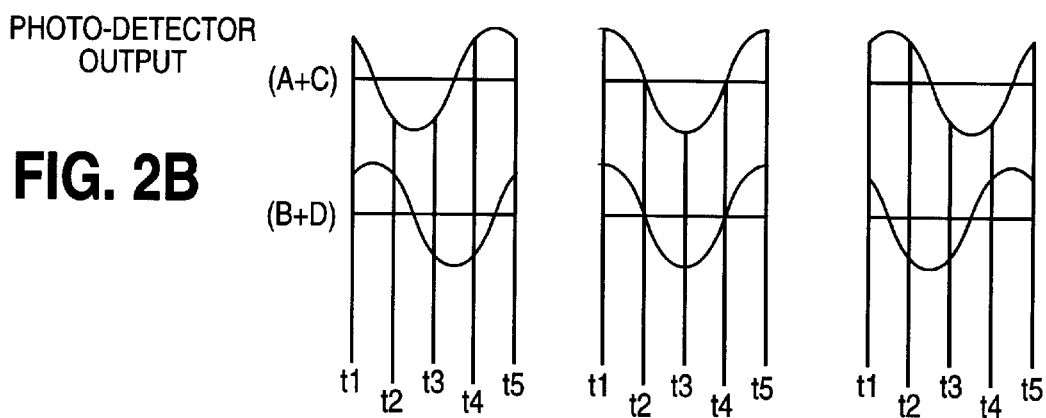
Figure 2C:
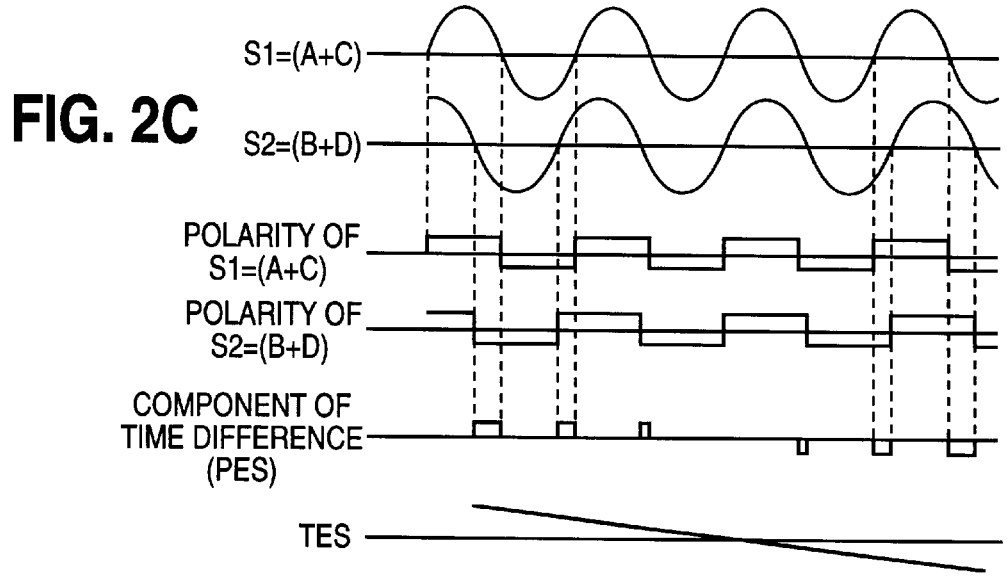

For DVD mode, the present invention generates the tracking error signal (TES) for use during seeking using a differential phase detector (DPD) The DPD computes a dual arm correlation of the diagonal signals S1 and S2 output by the four-quadrant photodetector shown in FIG. 2C. In the preferred embodiment, the diagonal signals S1 and S2 are sampled and converted into binary signals S1(n) and S2(n). The dual arm correlation (DAC) is computed as the difference between a positive correlation and a negative correlation of the diagonal signals S1(n) and S2(n) at a predetermined correlation offset $$DAC(\Delta) \sum_{1}^{L} S1(n) \otimes S2(n-\Delta) - \sum_{1}^{L} S2(n) \otimes S1(n-\Delta)$$

where the first term represents the positive correlation and the second term represents the negative correlation. In the above equation, L is the length of the correlation which is carried out by summing the XNOR (i.e., $\overline{XOR}$ denoted $\otimes$) of the corresponding L-bits in the binary signals S1(n) and S2(n).

Figure 3A:
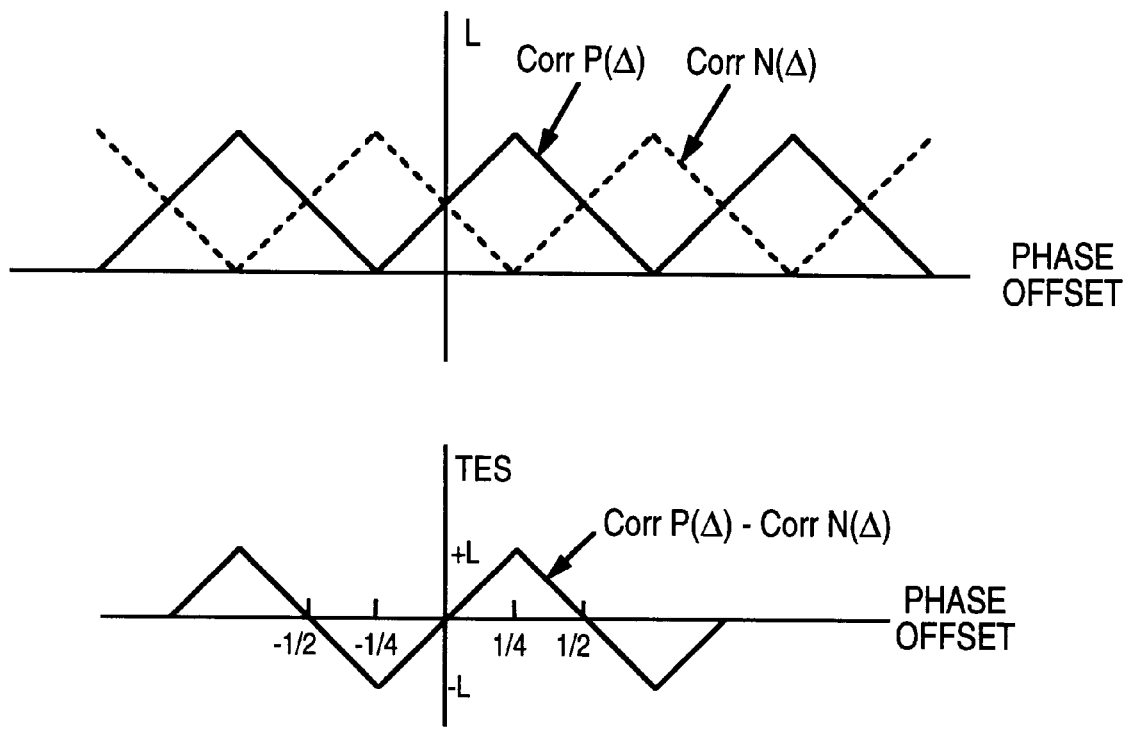
FIG. 3A shows the waveforms according to the dual arm correlation technique of the present invention for generating the position error signal during tracking.

FIG. 3A shows the waveforms corresponding to the positive correlation CorrP(Δ) and the negative correlation CorrN(Δ), as well as the resulting tracking error signal (TES) computed as the difference between the positive and negative correlations. The x-axis represents the phase offset between the diagonal signals S1 and S2, which is also the tracking error. In this embodiment, the correlation offset Δ remains fixed at approximately ¼ the period of S1 and S2. Notice that the maximum range of TES in this embodiment is only plus or minus one-quarter of a track. If the correlation offset is not set to ¼ the period of S1 and S2, or if the frequency of S1 and S2 drift due to variations in angular velocity of the disk, then the maximum track range for TES is reduced even further. Furthermore, because the correlation offset Δ is fixed, the positive and negative correlations are sensitive to the frequency content of the recorded data which results in undesirable gain variance similar to the prior art differential phase detectors described above.

Adaptive Dual Arm Correlator

Figure 3B:
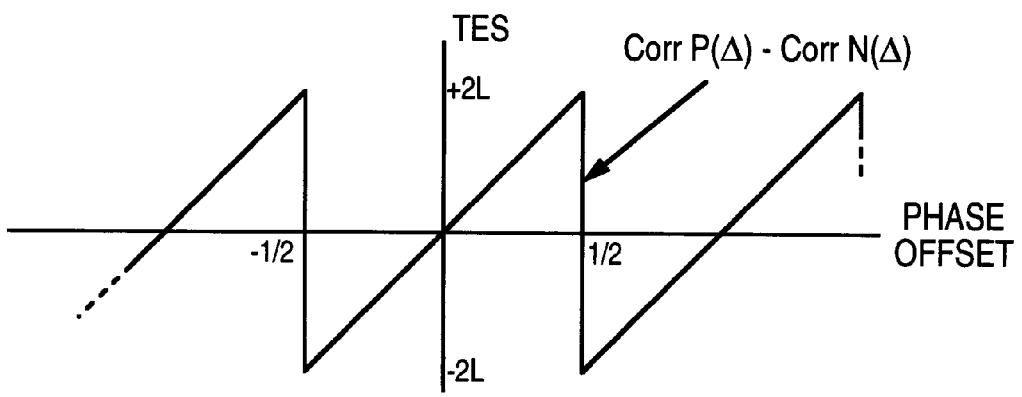
FIG. 3B shows the waveforms according to the adaptive dual arm correlation technique of the present invention which is insensitive to the frequency content of the recorded data and provides an increase in range to plus or minus one-half a track.

In order to increase the range of the TES to one-half a track, as well as compute the TES in a manner that is insensitive to the frequency content of the recorded data, the present invention employs an adaptive dual arm correlator (ADAC). The ADAC of the present invention adaptively adjusts the correlation offset Δ in order maximize the correlation between S1 and S2. In this manner, the instantaneous correlation offset Δ represents the phase offset between the diagonal signals S1 and S2 over a range of plus or minus one-quarter of a track, and the difference between the positive and negative correlations CorrP(Δ) and CorrN(Δ) represents the phase offset (i.e, TES) over a range extending to plus or minus one-half of a track as shown in FIG. 3B. Additionally, the ADAC of the present invention is substantially insensitive to the frequency content of the recorded data which allows for a higher servo tracking bandwidth due to a reduction in gain variance.

Figure 4:
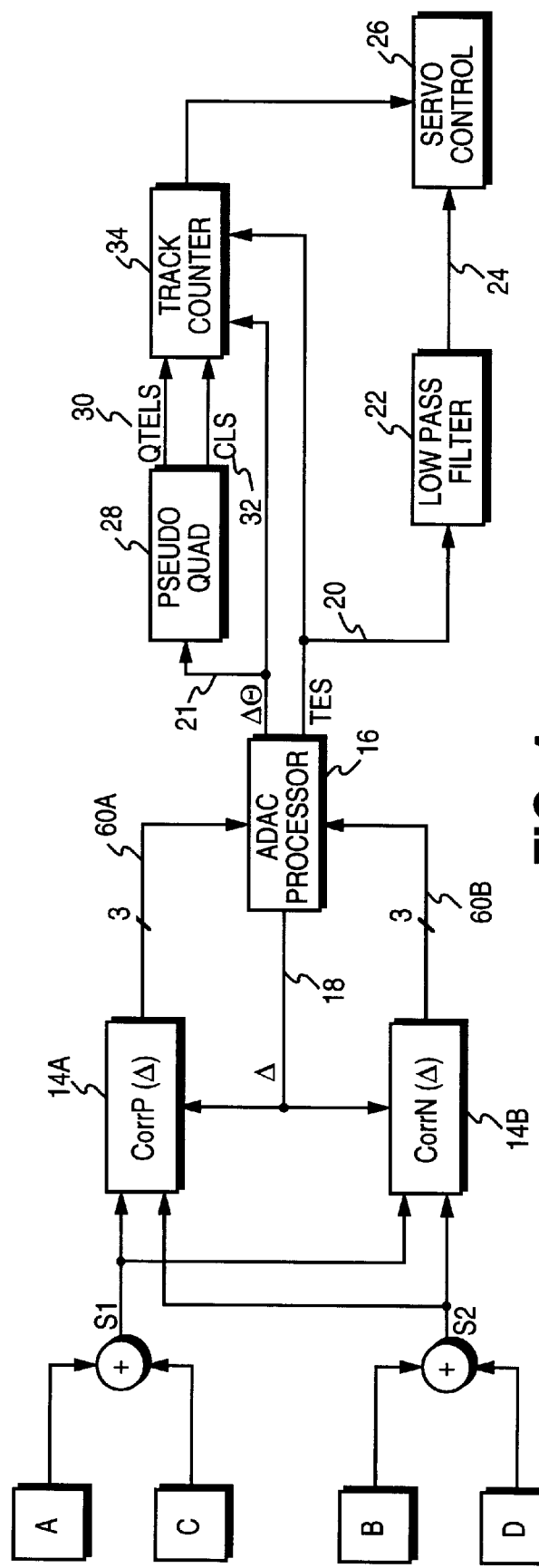
FIG. 4 is a block diagram of the adaptive dual arm correlator of the present invention.

FIG. 4 shows a block diagram overview of the ADAC differential phase detector of the present invention. The quadrants A and C of the photodetector are added (ORed) to generate the diagonal signal S1, and the quadrants B and D are added (ORed) to generate the diagonal signal S2. The diagonal signals S1 and S2 are then input into a positive correlator CorrP(Δ) 14A and a negative correlator CorrN(Δ) 14B, both of which generate three correlation signals which are input into an ADAC processor 16 for use in computing the updated correlation offset Δ18 as described in more detail below with reference to the flow diagram of FIG. 7. The ADAC processor computes the TES 20 as the difference between the positive and negative correlations. The TES 20 is low pass filtered 22 to generate a tracking control signal 24 input into a servo controller 26 for positioning the optical transducer over the centerline of the selected track during read operations. The ADAC processor 16 also generates a phase offset signal ΔΘ 21 representing the phase offset between diagonal signals S1 and S2. A pseudo quadrature signal generator 28 processes the phase offset signal ΔΘ 21 to generate a tracking error logic signal (QTELS) 30 and a centerline logic signal (CLS) 32 for use by a track counter 34 in counting track crossings during seek operations. The phase offset signal ΔΘ 24 and the tracking error signal (TES) 20 are also input into the track counter 34 and used to generate a quadrature signal in an alternative embodiment described in greater detail below.

Figure 5A:
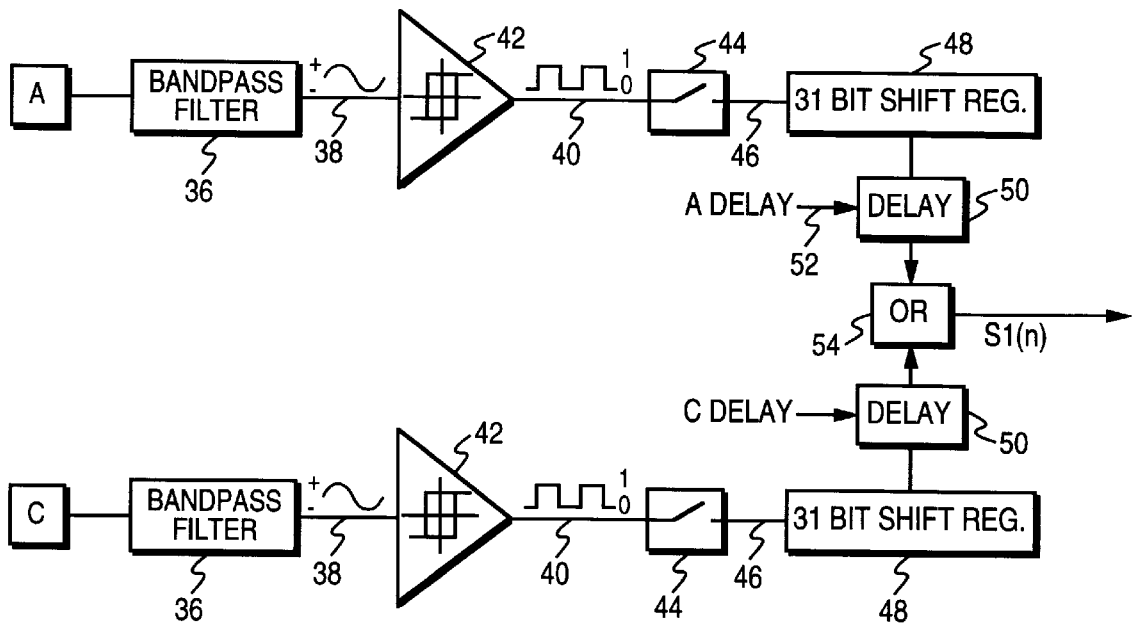
FIGS. 5A and 5B shows details on the preferred embodiment for sampling the four-quadrant photodetector signals and for generating the diagonal signals S1 and S2.
Figure 5B:
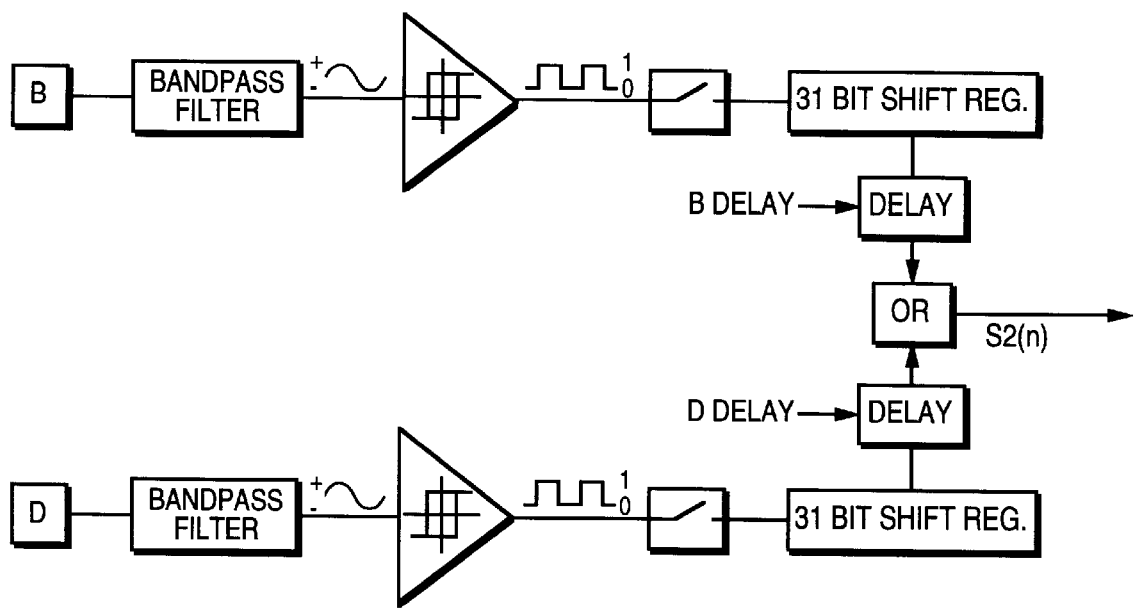

Referring now to FIGS. 5A and 5B, shown is the preferred embodiment for the front-end circuitry for sampling the photodetector signals A, B, C, and D, and generating the diagonal signals S1(n) and S2(n). A bandpass filter 36 filters the photodetector signals to attenuate the DC component (including the track crossing frequency) and to attenuate aliasing noise. The sinusoidal signals 38 output by the bandpass filter 36 are converted into polarity square wave signals 40. The conversion is achieved by passing the sinusoidal signals 38 through polarity comparators 42 that use hysteresis to prevent extraneous pulses in the output around the zero crossings. The polarity square waves are then sampled 44 and converted into binary square wave signals 46 that are shifted into 31-bit shift registers 48. The shift registers 48 allow the user to selectively delay the photodetector signals with respect to one another in order to calibrate the servo control system according to the particular characteristics of the storage device. The delay elements 50 are implemented as a multiplexer for selecting the appropriate output of the shift registers 48 according to the delay value asserted over control line 52. The diagonal signals S1(n) and S2(n) are then generated by ORing 54 the binary square wave signals output by the delay elements 50 to generate the signals (A+C) and (B+D), respectively. The diagonal signals S1(n) and S2(n) are then input into the positive and negative correlators CorrP(Δ) 14A and CorrN(Δ) 14B of FIG. 4.

Figure 6:
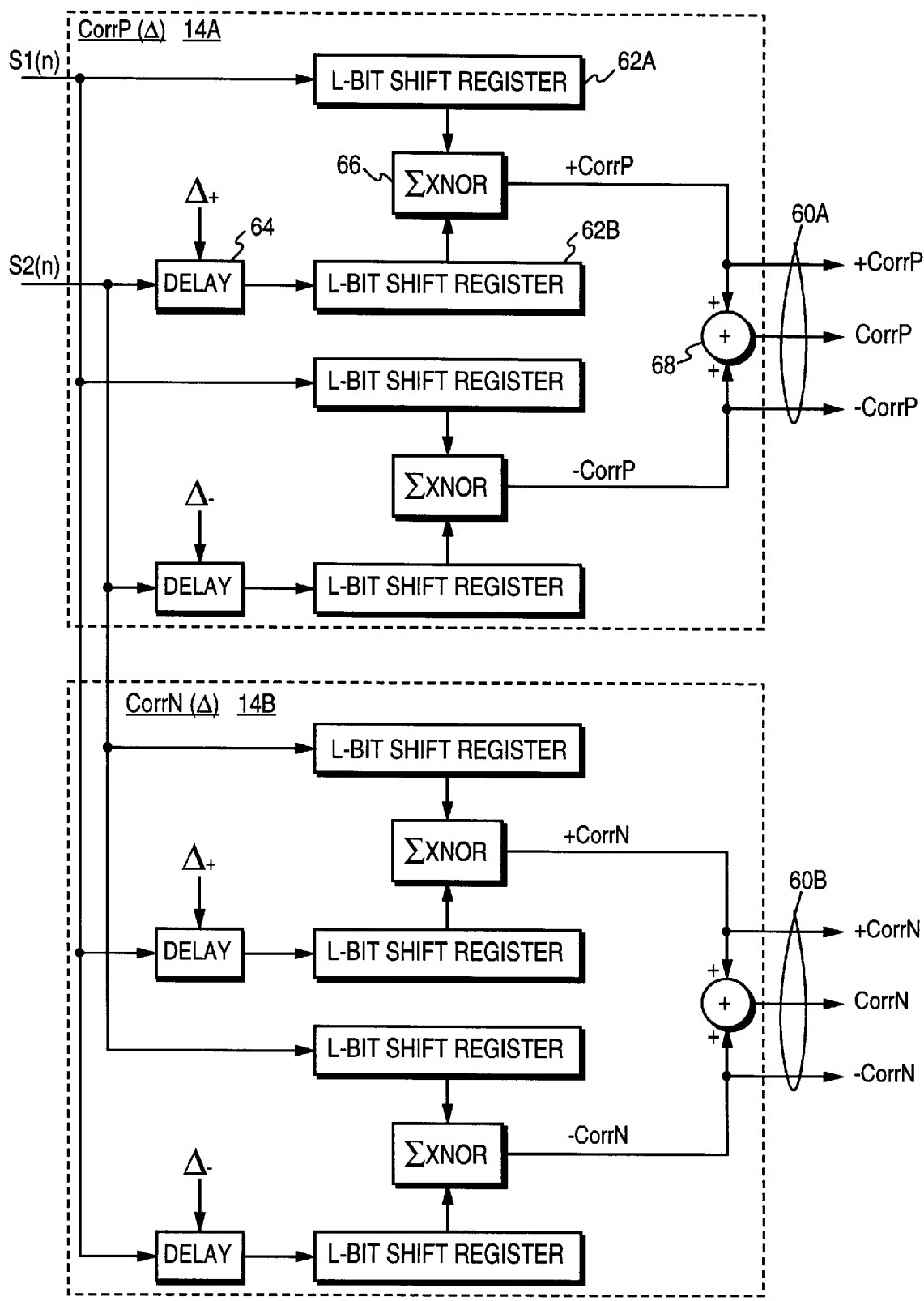
FIG. 6 shows details of the positive and negative correlators CorrP($\Delta$) and CorrN($\Delta$) which compute their respective correlations by adding adjacent correlations at $\Delta$+ and $\Delta$−.

Further details of the positive and negative correlators CorrP(Δ) 14A and CorrN(Δ) 14B are shown in FIG. 6. Part of the adaptive algorithm is to compute two correlations separated by a predetermined offset for each of the positive and negative arms designated ±CorrP and ±CorrN. The correlation offset Δ is then adaptively adjusted in a direction that maximizes the positive or negative correlation as described below. Thus, the positive correlator CorrP(Δ) 14A computes +CorrP according to a correlation delay Δ+, and computes a positive correlation −CorrP according to a correlation delay Δ−, where Δ− is slightly smaller than Δ+. Similarly, the negative correlator CorrN(Δ) 14B computes negative correlations +CorrN and −CorrN using the correlation offsets Δ+ and Δ−, respectively.

To compute the correlation signal +CorrP, the diagonal signal S1(n) is shifted undelayed into a first L-bit shift register 62A and the diagonal signal S2(n) is shifted into a second L-bit shift register 62B after being delayed by Δ+ 64. The length L of the shift registers determines the length of the correlation. The correlation signal +CorrP is generated by summing the XNOR 66 of the corresponding bits stored in the shift registers 62A and 62B, where XNOR (denoted $\otimes$) is an inverted XOR function $$+CorrP(\Delta+) = \sum_{1}^{L} S1(n) \otimes S2(n - \Delta+).$$

Similar circuitry is provided to generate the correlation signal −CorrP using Δ− as the correlation offset. The correlation signals +CorrP and −CorrP are then added at adder 68 to generate the positive correlation signal CorrP.

Figure 7:
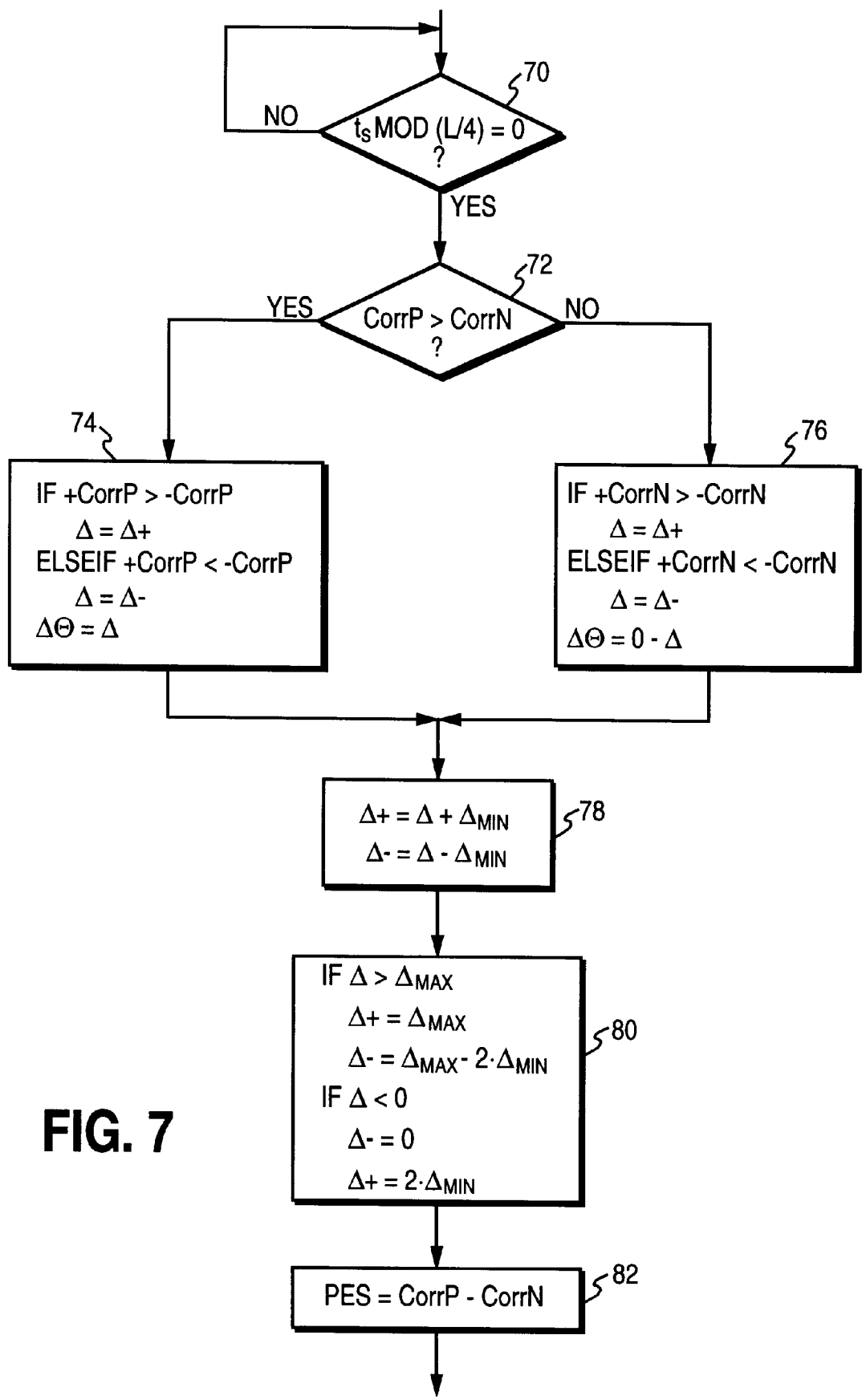
FIG. 7 is a flow diagram showing how the correlation offset $\Delta$ is adaptively adjusted to maximize the positive or negative correlations.

The negative correlator 14B for computing the negative correlation signals +CorrN, −CorrN and CorrN comprises the same circuitry as the positive correlator 14A of FIG. 7 except that S1(n) is undelayed and S2(n) is delayed by the correlation offsets Δ+ and Δ−.

In the preferred embodiment, the correlation is computed at a frequency of once per L/4 bits shifted into the shift registers. That is, the correlation frequency is 4/L times the sampling frequency of the diagonal signals S1 and S2 such that each correlation is computed with L/4 new samples of S1(n) and S2 (n). The length and frequency of the correlation can be programmably adjusted in order to optimize the DPD based on system dynamics such as the linear velocity of the disk at a particular track or the current seek velocity as described in greater detail below.

The positive correlation signals (+CorrP, CorrP, −CorrP) 60A and the negative correlation signals (+CorrN, CorrN, −CorrN) 60B are transferred to the ADAC processor 16 of FIG. 4 which computes the updated correlation offsets Δ+ and Δ− according to the flow diagram shown in FIG. 7. The flow diagram of FIG. 7 updates the correlation offsets Δ+ and Δ− in a direction that will maximize the positive or negative correlation values CorrP or CorrN. At step 70, the ADAC processor waits in a loop for the next correlation period (i.e., when the sampling periods $t_s$ modulo divided by L/4 equals zero). Then at step 72, the magnitude of the positive and negative correlation signals CorrP and CorrN are compared. If CorrP is greater than CorrN, then at step 74 the correlation offset Δ is updated to Δ+ or Δ− according to the maximum between +CorrP and −CorrP. If CorrP is less than CorrN, then at step 76 the correlation offset Δ is updated to Δ+ or Δ− according to the maximum between +CorrN and −CorrN. Also at steps 74 and 76, the phase offset ΔΘ between the diagonal signals S1(n) and S2(n) is saved and used to compute the quadrature signal for seeking as described below. At step 78, the correlation offsets Δ+ and Δ− are updated to the current value of Δ plus and minus a predetermined offset $\Delta_{MIN}$. If the updated correlation offsets are out of range, then at step 80 they are adjusted to a maximum or minimum value as necessary. Finally, the tracking error signal (TES) is computed as the difference between CorrP and CorrN at step 82.

Referring again to FIG. 4, the tracking error signal (TES) 20 is low pass filtered 22 to generate a tracking error signal (TES) 24 used by the servo controller 26 for positioning the optical transducer over a centerline of the selected track during read operations. The ADAC processor 16 also transmits the phase offset ΔΘ 21 between S1(n) and S2(n) to the quadrature signal generator 28 which generates quadrature signals QTELS 30 and CLS 30 for counting track crossings during seek operations.

Figure 8A:
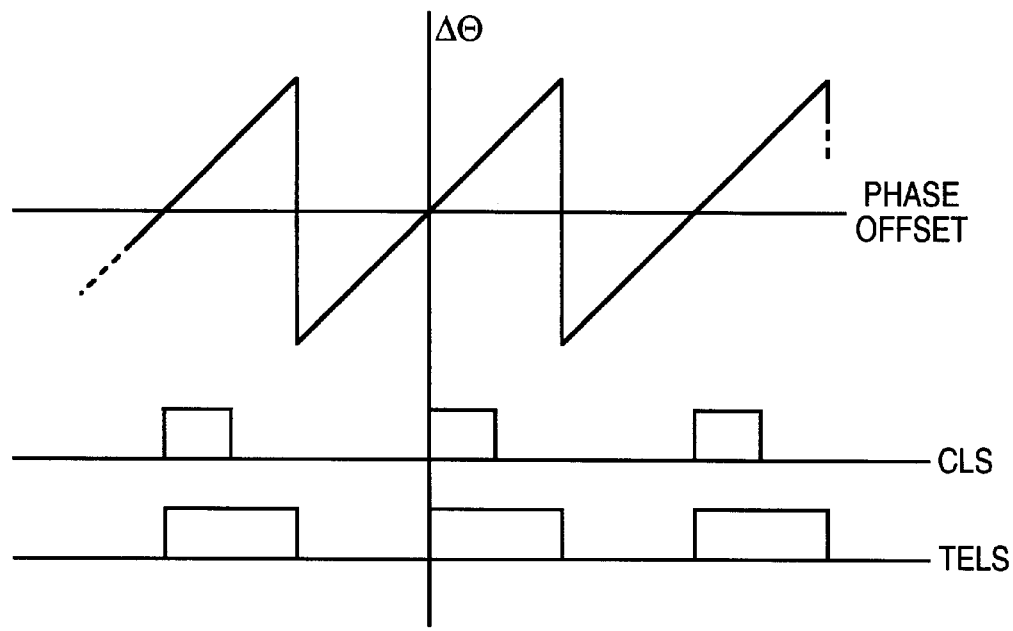
FIG. 8A–8D illustrate how the quadrature signal used for counting track crossings when seeking is generated using the correlation offset $\Delta$.
Figure 8B:
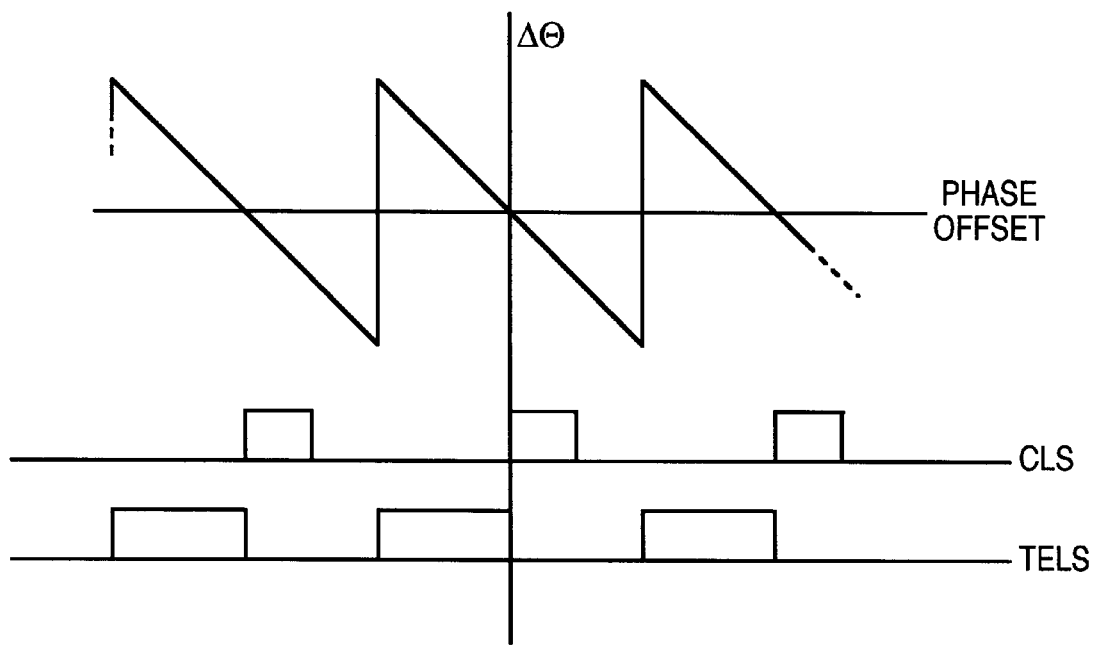

The operation of the quadrature signal generator 28 is understood with reference to FIG. 8A and 8B which show a phase offset ΔΘ, centerline logic signal (CLS) and tracking error logic signal (TELS) for a forward seek and a reverse seek, respectively, as the optical transducer crosses over the tracks. If the velocity of the optical transducer is below the worst case runout velocity, then the tracking error logic signal (TELS) is updated by executing the following pseudo code:

if $(\Delta\Theta(i) > 0)$ & $(\Delta\Theta(i - 1) > 0)$ & $(\Delta\Theta(i) < 0.5^*\Delta\Theta_{max})$ &

$(\Delta\Theta(i - 1) < 0.5^*\Delta\Theta_{max})$

TELS(i) = 1.;

elseif $(\Delta\Theta(i) < 0)$ & $(\Delta\Theta(i - 1) < 0)$ & $(\Delta\Theta(i) > -0.5^*\Delta\Theta_{max})$ &

$(\Delta\Theta(i - 1) > -0.5^*\Delta\Theta_{max})$

TELS(i) = 0.;

else

TELS(i) = TELS(i - 1);

The above pseudo code performs the following operations. If the phase error ΔΘ is greater than zero and less than $0.5^*\Delta\Theta_{max}$ for two correlation periods, then TELS is set to 1 as seen in FIG. 8A. Conversely, if the phase offset ΔΘ is less than zero and greater than $-0.5^*\Delta\Theta_{max}$ for two correlation periods, then the TELS is set to 0. Otherwise, TELS is left unchanged by setting it to the prior TELS value. Evaluating the polarity of the phase error ΔΘ for two correlation periods as well as against the maximum and minimum limits of $\pm 0.5^*\Delta\Theta_{max}$ introduces hysteresis into generating the TELS signal so that extraneous pulses are avoided near the zero crossings. If the velocity of the optical transducer is above the predetermined threshold (i.e., during a seek operation), then it is not necessary to check the phase offset against the maximum and minimum limits $\pm 0.5^*\Delta\Theta_{max}$ (i.e., the TELS is updated over the entire saw tooth waveform of FIG. 8A except near the centerline zero crossing).

The quadrature signal generator 28 then executes the following source code:

if $(abs(\Delta\Theta(i) - \Delta\Theta(i - 1)) > 1.5^*\Delta\Theta_{max})$ & (TELS(i)==1)

seek(i) = 1;

elseif $(abs(\Delta\Theta(i) - \Delta\Theta(i - 1)) > 1.5^*\Delta\Theta_{max})$ & (TELS(i)==0)

seek(i) = 0;

which determines the seek direction of the optical transducer (i.e., forward or reverse seek). During a forward seek TELS will be 1 when the phase offset ΔΘ transitions from $+\Delta\Theta_{max}$ to $-\Delta\Theta_{max}$ as shown in FIG. 8A, and during a reverse seek TELS will be 0 when the phase offset ΔΘ transitions from $-\Delta\Theta_{max}$ to $+\Delta\Theta_{max}$ as shown in FIG. 8B.

The centerline logic signal (CLS) is generated according to the following pseudo code:

```
TELS_CHANGED = (TELS(i) != TELS(i – 1));

if (TELS_CHANGED) & (seek(i)==1) & (TELS(i) – TELS(i – 1)==1) {

CLS(i) = 1;

clcnt = 0;

clwidth = 0;

} elseif (TELS_CHANGED) & (seek(i)==0) & (TELS(i) – TELS(i – 1)== – 1) {

CLS(i) = 1;

clcnt = 0;

clwidth = 0;

} if (clpulse < 4) {

CLS(i) = 1;

clwidth = clwidth + 1;

} else

CLS(i) = 0;
```

The above pseudo code performs the following operations. The flag TELS_CHANGED indicates whether the TELS signal has changed (i.e, transitioned from 0→1 or from 1→0). If during a forward seek the TELS changes such that TELS(i)-TELS(i-1) is 1, then the CLS signal is set to 1 indicating that the phase offset $\Delta\Theta$ crossed zero due to the optical transducer crossing over the centerline of the track. Similarly, if during a reverse seek the TELS changes such that TELS(i)-TELS(i-1) is -1, then the CLS signal is set to 1 indicating that the phase offset $\Delta\Theta$ crossed zero due to the optical transducer crossing over the centerline of the track. The centerline count (clcnt) keeps track of the amount of time that transpires between centerline pulses and is used to force a centerline pulse if a centerline crossing is not detected within a predetermined time limit; clcnt is reset to zero when a centerline crossing is detected. The counter centerline width (clwidth) determines the pulse width of the centerline pulse; it is reset to zero when a centerline crossing is detected. The CLS signal remains 1 until the clwidth counter increments past four, then the CLS signal is reset to 0. That is, the width of the centerline pulse is four correlation time periods.

The pseudo code for forcing a centerline pulse when the counter clcnt exceeds the time limit is shown below:

```
if (TELS_CHANGED) { if (clcnt > 1.5*pcnt) {

CLS(i) = 1;

clwidth = 0;

} pcnt = 0;
```

-continued

```
    } else pcnt = pcnt + 1;
```

The period count (pcnt) tracks the length of a half-period of the TELS signal by counting the cycles between when the TELS signal changes (TELS_CHANGED). If the counter clcnt exceeds 1.5*pcnt (1.5 times the half-period of TELS), then a centerline pulse is forced by setting CLS to 1 and resetting the clcnt and clwidth counters to zero.

Figure 8C:
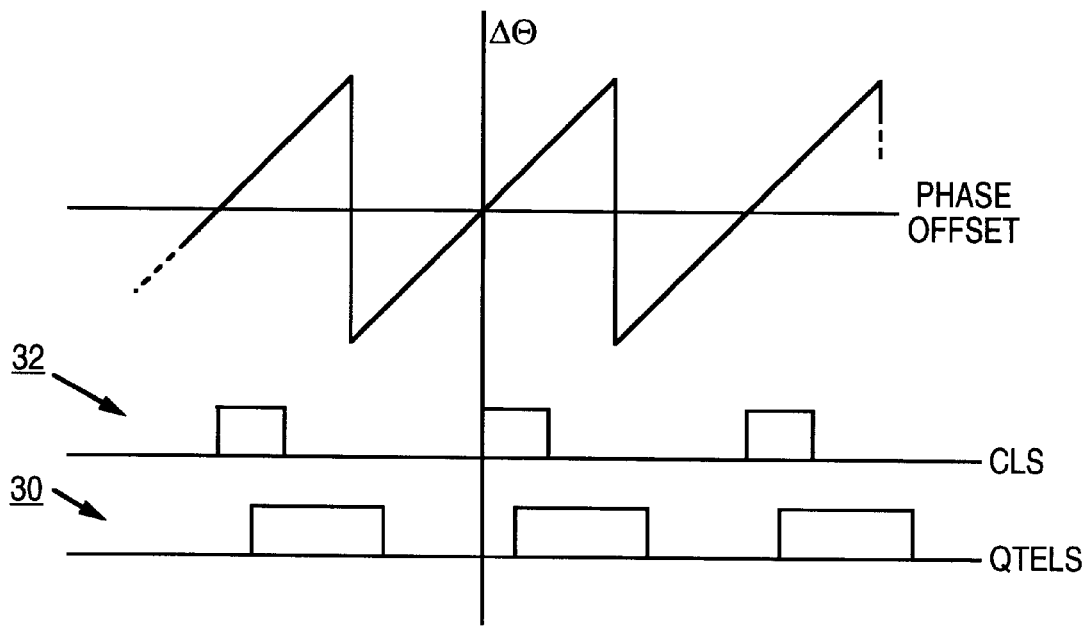
Figure 8D:
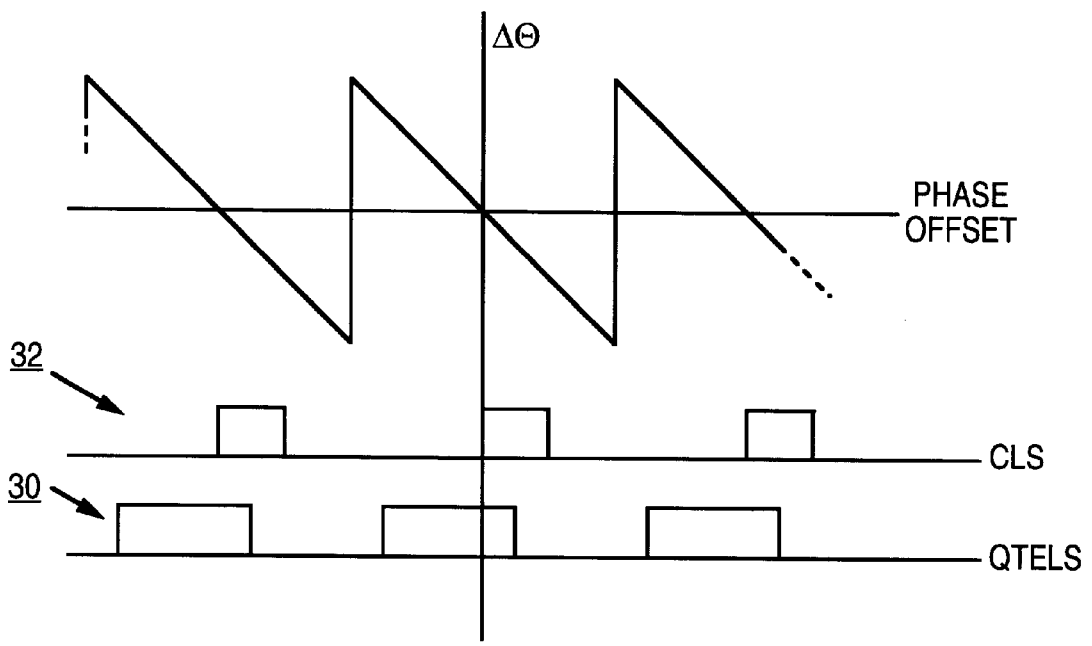

If a centerline crossing is not detected and not forced, then clcnt is simply incremented. In order to generate the quadrature signal (a signal with four states per track crossing), the TELS signal is delayed by two correlation periods as shown in FIG. 8C and 8D for the forward and reverse seek, respectively. The pseudo code for incrementing clcnt and delaying TELS to generate QTELS 30 is shown below.

$$clcnt=clcnt+1;$$

$$QTELS(i)=TELS(i-2);$$

Thus, the pseudo quadrature signal generator 28 generates the CLS signal 32 and the QTELS signal 30 shown in FIG. 8C and 8D for use by the track counter 34 of FIG. 4 for counting the track crossings during seek operations.

Quadrature Signal Generator

The present invention provides various alternative embodiments for generating a quadrature signal used to count track crossings during a seek operation. In addition to generating a quadrature signal from the CLS signal 32 and the QTELS signal 30 output by the DPD as described above with reference to FIG. 8A–8D, the present invention alternatively uses the TES and RF data signal to generate a quadrature signal. Details of the various alternative embodiments for generating the quadrature signal are shown in FIG. 10.

When the storage system is configured for CD format, the TES analog signal 90 is generated at the output of adder 92 by taking the difference between the E and F photodiode signals. The TES signal 90 is then sampled 94 at approximately 12 MHz to generate a discrete-time TES signal 96. For DVD format, the TES signal is generated by the DPD 98 as described above. Referring to FIG. 4, the DPD 98 generates a seek TES signal 21 (the phase offset ΔΘ) and a tracking TES signal 20 (the difference between the positive and negative correlators), either of which can be used in generating the quadrature seek signal. A multiplexer 100 in FIG. 10 is configured by a microcontroller (not shown) to select the desired TES signal depending on the mode of operation.

Figure 11:
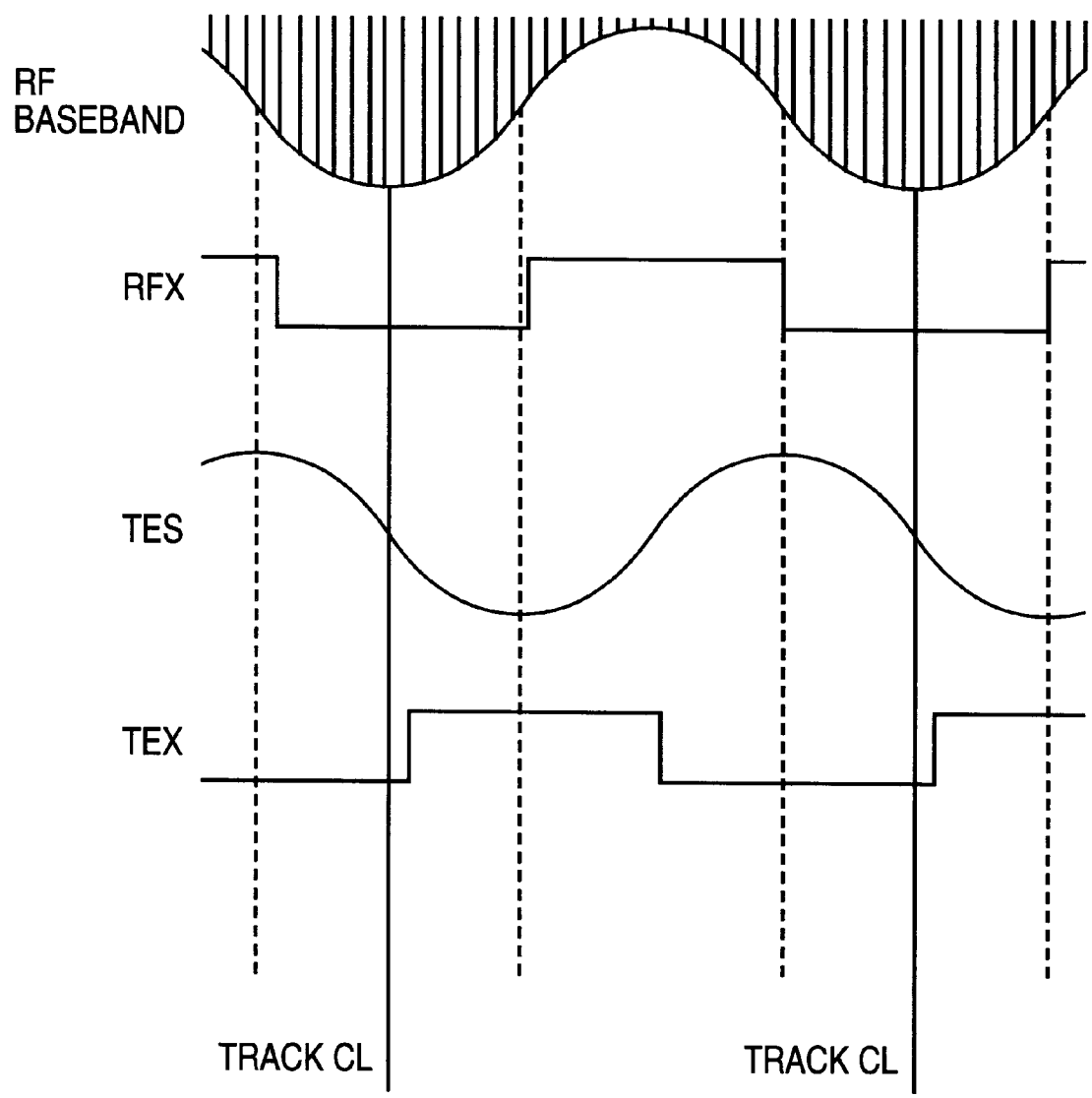
FIG. 11 shows the sinusoidal RF baseband signal at the output of an envelope detector in relation to the sinusoidal TES signal; together the signals form a quadrature seek signal.

An RF data signal 102 is generated at the output of adder 104 as the summation (A+B+C+D) of the photodiodes in the four-quadrant photodetector 6. The RF data signal 102 is sampled by the read channel sampling device 106 to generate a discrete-time RF data signal 108. A discrete-time envelope detector 110 processes the discrete-time RF data signal 108 to extract a RF baseband signal indicative of the light-beam's position with respect to the centerline of a track. As seen in FIG. 11, the purpose of the envelope detector 110 is to track the peaks of the RF data signal during a seek operation to generate a sinusoidal signal offset by 90 degrees from the TES signal (thereby forming a quadrature signal). The present invention is designed to account for varying channel sampling rates; in the embodiment disclosed herein, the channel sampling rate is selected from 29.64 MHz, 59.27 MHz and 118.5 MHz. Since these frequencies do not match the sample frequency of the TES signal 114, it is necessary to synchronize the samples of the TES and RF baseband signals before processing the quadrature seek signal to count track crossings.

It is also necessary to filter the TES and RF baseband signals to extract the track crossing frequency (the fundamental frequency) to generate sinusoidal signals and to attenuate noise at higher frequencies. Extracting the track crossing frequency entails decimating the TES and RF baseband signals relative to the seek velocity, and then filtering the decimated signals with a lowpass discrete-time filter. Because the signals are decimated relative to the track crossing frequency, the bandwidth of the discrete-time lowpass filters 116A and 116B automatically scale to the desired cutoff frequency.

A synchronizer circuit 118 shown in FIG. 10 synchronizes and decimates the TES and RF baseband signals according to the current seek velocity and mode of operation, CD or DVD. For CD format, the following table illustrates how the TES and RF baseband signals are decimated

TABLE 1

| Seek Velocity 1000 trks/sec | Sample Frequency M samples/sec | RF Baseband Decimation Factor | TES Subsample Factor |
| --- | --- | --- | --- |
| 301–590 | 5.9 | 5, 10, 20 | 2 |
| 151–300 | 3 | 10, 20, 40 | 4 |
| 75–150 | 1.5 | 20, 40, 80 | 8 |
| 38–74 | 0.74 | 40, 80, 160 | 16 |
| 0–37 | 0.37 | 80, 160, 320 | 32 |

The first column in the above table represents the range of track crossing frequencies encountered during a seek operation. In the preferred embodiment, a servo controller estimates the current seek velocity and programs the synchronizer 118 according to Table 1 so that the decimated TES and RF baseband signals maintain a sample frequency (column 2) at least ten times the track crossing frequency. Alternatively, the synchronizer 118 could be adjusted automatically as the seek velocity changes without intervention from a servo controller.

As described above, when configured for CD format the analog TES signal 90 is sampled 94 at a constant frequency of approximately 11.85 MHz. The synchronizer 118 decimates the discrete-time TES signal 96 by simply subsampling the signal to match the desired sample rate (i.e., to match the sample rate of column 2). To simplify the implementation complexity and cost, the decimated sample frequencies of column 2 have been selected such that the TES signal can be subsampled by powers of two (2, 4, 8, 16 and 32).

Figure 12:
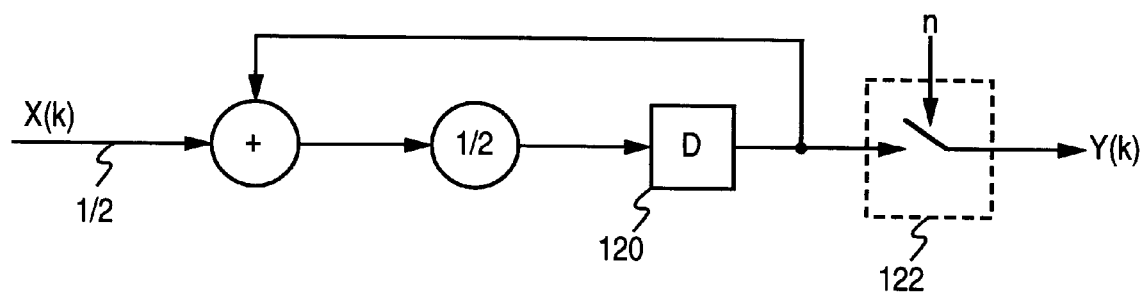
FIG. 12 is a block diagram of an moving average filter for decimating the RF baseband signal in order to synchronize it to the track crossing frequency and the TES signal.

The RF baseband signal 112 is decimated using a recursive, weighted, moving average filter, the details of which are shown in FIG. 12. This filter performs the following operation:

$$y(k)=(y(k-1)+x(k))1/2 \quad k=1 \rightarrow n$$

where n is the decimation factor shown in column 3 of Table 1. After processing n samples of the RF baseband signal x(k), the value stored in the delay register 120 is extracted 122. The three decimation values in each entry in column 3 correspond to the decimation factor n for the three channel sampling frequencies 29.64 MHz, 59.27 MHz and 118.5 MHz, respectively.

For DVD format, the channel sampling rate is fixed at 118.5 MHz and the TES signal 114 is generated by the DPD 98 either as the seek TES signal 21 (the phase offset ΔΘ) or the tracking TES signal 20 (the difference between the positive and negative correlators). The sample frequency of the TES signal 114 is adjusted to be approximately ten times the track crossing frequency by adjusting the correlation length L for the DPD correlators described above. The sample frequency of the RF baseband signal 112 is adjusted to the desired frequency using the moving average filter of FIG. 12. The following table illustrates how the correlation length L is adjusted to synchronize the TES signal as well as the accumulation interval n used to synchronize the RF baseband signal:

TABLE 2

| Seek Velocity 1000 trks/sec | Sample Frequency M samples/sec | RF Baseband Decimation Factor | DPD Correlation Length L |
| --- | --- | --- | --- |
| 1371–1480 | 14.8 | 8 | 32 |
| 1186–1370 | 13.17 | 9 | 36 |
| : | : | : | : |
| 0–11 | 0.11 | 1023 | 4092 |

Note that in the above Table 2 the resolution for the correlation length L and the decimation factor for the moving average filter is one bit, which is significantly higher than for the CD settings of the above Table 1. This is necessary because the track crossing frequency is much higher due to the increased seek speed and density in tracks-per-inch (TPI) for DVD as compared to the CD format, and because in DVD mode the DPD detects track crossings from the data signal.

Figure 9:
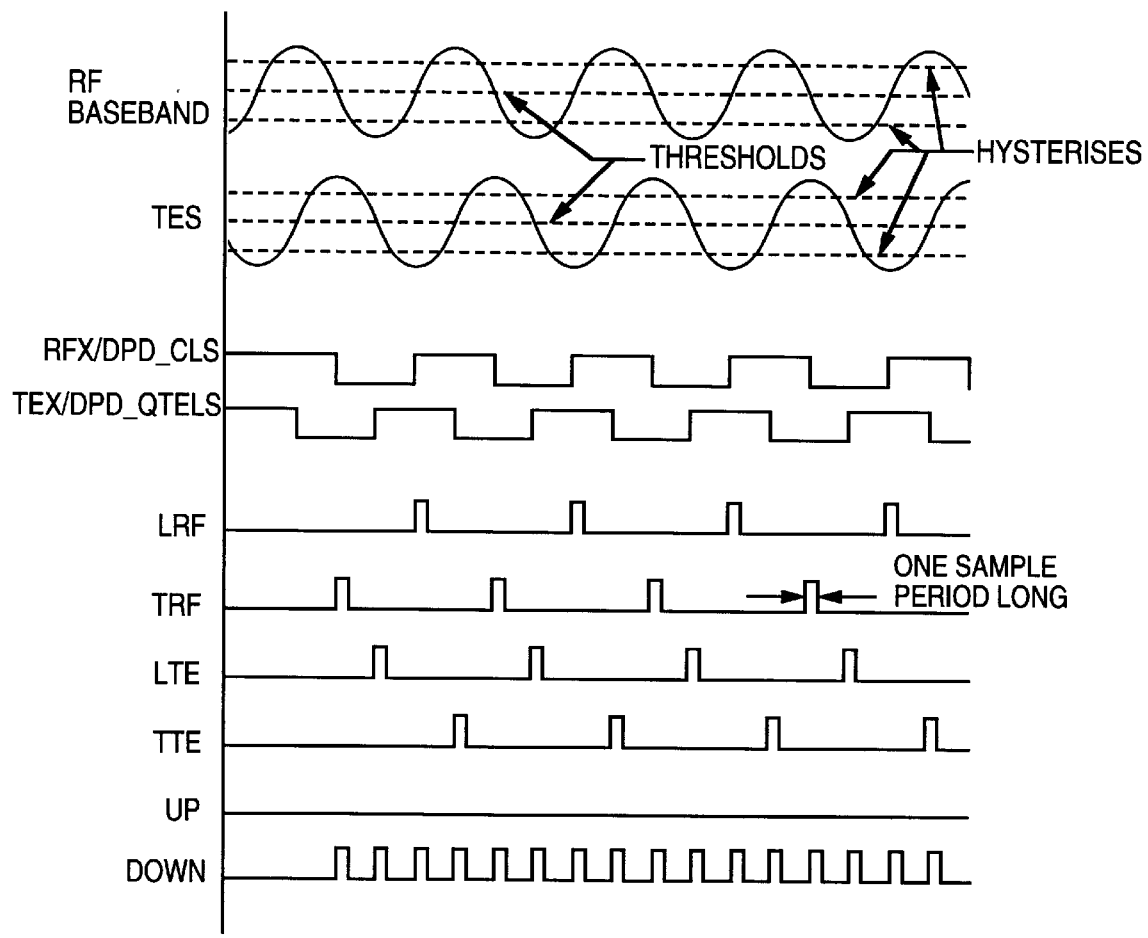
FIG. 9 illustrates the signals generated during a seek operation, including the TES and RF baseband data signals for counting track crossings.

Once the TES and RF baseband signals have been decimated and synchronized, they are passed through respective discrete-time low pass filters 116A and 116B in order to extract the track crossing frequency (the fundamental frequency) and to attenuate high frequency noise. The resulting sinusoidal signals offset by 90 degrees are shown in FIG. 9 (the signals are actually discrete-time samples of the signals shown in FIG. 9). The sinusoidal TES signal 124 and RF baseband signal 126 are converted into binary square wave signals TEX 128 and RFX 130 by a TEX detector 132 and RFX detector 134, respectively. The TEX and RFX detectors comprise comparators (slicers) for comparing the samples of the sinusoidal signals to a programmable positive and negative threshold settings, wherein the output binary square wave changes state when the sinusoidal signal crosses a threshold as shown in FIG. 9. To prevent the detection of spurious pulses, the comparators employ a programmable hysteresis setting where the output changes state only if the hysteresis thresholds (shown as dotted lines in FIG. 9) are exceeded. To further increase the noise immunity, the output of the comparator will not change states until two consecutive samples exceed the hysteresis threshold. Thus, the TEX and RFX detectors 132 and 134 of FIG. 10 are programmed by the servo controller with a threshold setting and a hysteresis setting.

The binary square wave signals TEX 128 and RFX 130 form a quadrature seek signal; multiplexers 136 and 138 select these signals or the DPD_QTELS and DPD_CLS signals output by the DPD 98 as the input to the counter logic 140 of FIG. 10. The counter logic 140 generates the following signals which are shown in FIG. 9:

$$LRF(k) = RFX(k) \cdot \overline{RFX(k-1)}$$

$$TRF(k) = \overline{RFX(k)} \cdot RFX(k-1)$$

$$LTE(k) = TEX(k) \cdot \overline{TEX(k-1)}$$

$$TTE(k) = \overline{TEX(k)} \cdot TEX(k-1)$$

$$UP(k) = LRF(k) \cdot \overline{TEX(k)} + TRF(k) \cdot TEX(k) +$$
$$LTE(k) \cdot RFX(k) + TTE(k) \cdot \overline{RFX(k)}$$

$$DOWN(k) = LRE(k) \cdot TEX(k) + TRF(k) \cdot \overline{TEX(k)} +$$
$$LTE(k) \cdot \overline{RFX(k)} + TTE(k) \cdot RFX(k).$$

The UP(k) signal increments a counter 142 in FIG. 10, and the DOWN(k) signal decrements the counter 142, or vice versa, depending on the intended seek direction. The end of seek is detected when the counter reaches a predetermined target value (e.g., when the counter decrements to zero).

The objects of the invention have been fully realized through the embodiments disclosed herein. Those skilled in the art will appreciate that the various aspects of the invention can be achieved through different embodiments without departing from the essential function. The particular embodiments disclosed are illustrative and not meant to limit the scope of the invention as appropriately construed by the following claims.

We claim:

1. In an optical disk storage device, a servo controller for positioning a light-beam over an optical disk storage medium by seeking to a target track and then tracking a centerline of the target track, the servo controller comprising:
    (a) a photodetector, responsive to the light-beam, for generating an analog position signal and an analog RF data signal, wherein the position signal represents the light-beam's position with respect to a centerline of a track and the RF data signal represents the data recorded on the track;
    (b) a sampling device for sampling the analog position signal to generate a discrete-time position signal;
    (c) a first discrete-time detector for detecting pulses in the discrete-time position signal indicative of the light-beam crossing a track; and
    (d) a track counter, responsive to the discrete time detector, for counting a number of tracks the light-beam crosses during a seek operation.

2. The servo controller as recited in claim 1, wherein the first discrete-time detector compares the discrete-time position signal to a threshold to generate a binary output signal having a first state when the discrete-time position signal is greater than the threshold and a second state when the discrete-time position signal is less than the threshold.

3. The servo controller as recited in claim 2, wherein the binary output signal does not change states until the discrete-time position signal exceeds the threshold by a predetermined amount.

4. The servo controller as recited in claim 2, wherein the binary output signal does not change states until the discrete-time position signal exceeds the threshold for more than one sample of the discrete-time position signal.

5. The servo controller as recited in claim 1, further comprising:
    (a) an envelope detector for extracting a discrete-time RF baseband signal from the analog RF data signal, wherein the discrete-time RF baseband signal represents the light-beam's position relative to the centerline of the track; and
    (b) a second discrete-time detector for detecting pulses in the discrete-time RF baseband signal indicative of the light-beam crossing a track, wherein the track counter is further responsive to the second discrete time detector.

6. The servo controller as recited in claim 5, further comprising a synchronizer for synchronizing a period of the discrete-time position signal and the discrete-time RF baseband signal.

7. The servo controller as recited in claim 6, wherein the synchronizer comprises a decimator for decimating at least one of the discrete-time position signal and discrete-time RF baseband signal.

8. The servo controller as recited in claim 6, wherein the synchronizer comprises a moving average filter for averaging a predetermined number of samples of at least one of the discrete-time position signal and discrete-time RF baseband signal.

9. The servo controller as recited in claim 5, wherein:
    (a) the first discrete-time detector compares the discrete-time position signal to a threshold to generate a binary output signal TEX(k) corresponding to when the discrete-time position signal is greater than or less than the threshold; and
    (b) the second discrete-time detector compares the discrete-time RF baseband signal to a threshold to generate a binary output signal RFX(k) corresponding to when the discrete-time RF baseband signal is greater than or less than the threshold.

10. The servo controller as recited in claim 9, wherein:
    (a) the track counter computes the following signals:

$$LRF(k)=RFX(k) \bullet \overline{RFX(k-1)};  \qquad (i)$$

$$TRF(k)=\overline{RFX(k)} \bullet RFX(k-1);  \qquad (ii)$$

$$LTE(k)=TEX(k) \bullet \overline{TEX(k-1)};  \qquad (iii)$$

and $$TTE(k)=\overline{TEX(k)} \bullet TEX(k-1);  \qquad (iv)$$

(b) the track counter increments a counter when a signal UP(k) is active and decrements the counter when a signal DOWN(k) is active; and (c) the UP(k) signal and DOWN(k) signals are generated according to:

(i) $UP(k) = LRF(k) \cdot \overline{TEX(k)} +$
$$TRF(k) \cdot TEX(k) + LTE(k) \cdot RFX(k) + TTE(k) \cdot \overline{RFX(k)};$$

(ii) $DOWN(k) = LRF(k) \cdot TEX(k) + TRF(k) \cdot \overline{TEX(k)} +$
$$LTE(k) \cdot \overline{RFX(k)} + TTE(k) \cdot RFX(k).$$

11. In an optical disk storage device, a servo controller for positioning a light-beam over an optical disk storage medium by seeking to a target track and then tracking a centerline of the target track, the servo controller comprising:
  (a) a photodetector, responsive to the light-beam, for generating an analog position signal and an analog data signal, wherein the position signal represents the light-beam's position with respect to a centerline of a track and the data signal represents the data recorded on the track;
  (b) a first sampling device for sampling the analog position signal to generate a discrete-time position signal;
  (c) a second sampling device for sampling the analog data signal to generate a discrete-time data signal;
  (d) an envelope detector, responsive to the discrete-time data signal, for generating a discrete-time RF baseband signal representing the light-beam's position from the centerline of the track;
  (e) a first discrete-time detector for detecting pulses in the discrete-time position signal indicative of the light-beam crossing a track;
  (f) a second discrete-time detector for detecting pulses in the discrete-time RF baseband signal indicative of the light-beam crossing a track; and
  (g) a track counter, responsive to the first and second discrete time detectors, for counting a number of tracks the light-beam crosses during a seek operation.

12. The servo controller as recited in claim 11, further comprising a synchronizer for synchronizing a period of the discrete-time position signal and the discrete-time RF baseband signal.

13. The servo controller as recited in claim 12, wherein the synchronizer comprises a decimator for decimating at least one of the discrete-time position signal and discrete-time RF baseband signal.

14. The servo controller as recited in claim 11, wherein the discrete-time position signal and the discrete-time RF baseband signal together form a quadrature seek signal for counting track crossings and for determining the light beam's radial direction of movement over the optical disk.

15. In an optical disk storage device, a servo controller for positioning a light-beam over an optical disk storage medium by seeking to a target track and then tracking a centerline of the target track, the servo controller comprising:
  (a) a means for generating a discrete-time position signal indicative of the light beam's position relative to a centerline of a track;
  (b) a means for detecting pulses in the discrete-time position signal indicative of the light-beam crossing a track; and
  (c) a means for counting a number of tracks the light-beam crosses in response to the detected pulses in the discrete-time position signal during a seek operation.

16. The servo controller as recited in claim 15, further comprising:
  (a) a means for generating a discrete-time RF baseband signal from an RF data signal representing data recorded on the optical disk storage medium, the RF baseband signal indicative of the light beam crossing tracks;
  (b) a means for detecting pulses in the discrete-time RF baseband signal indicative of the light-beam crossing a track, wherein the means for counting a number of tracks the light-beam crosses is further responsive to the detected pulses in the discrete-time RF baseband signal.

17. The servo controller as recited in claim 16, further comprising a means for synchronizing a period of the discrete-time position signal and the discrete-time RF baseband signal.

18. The servo controller as recited in claim 17, wherein the means for synchronizing comprises a means for decimating at least one of the discrete-time position signal and discrete-time RF baseband signal.

19. The servo controller as recited in claim 17, wherein the means for synchronizing comprises a means for averaging a predetermined number of samples of at least one of the discrete-time position signal and discrete-time RF baseband signal.

* * * * *